US012745091B2

(12) United States Patent
Gu et al.

(10) Patent No.: US 12,745,091 B2
(45) Date of Patent: Sep. 22, 2026

(54) NETWORK ELEMENT SELECTION METHOD, INFORMATION TRANSMISSION METHOD, APPARATUSES, AND NETWORK ELEMENT

(71) Applicants: China Mobile Communication Co., Ltd Research Institute, Beijing (CN); China Mobile Communications Group Co., Ltd., Beijing (CN)

(72) Inventors: Qun Gu, Beijing (CN); Aihua Li, Beijing (CN); Zhenning Huang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 312 days.

(21) Appl. No.: 18/294,364

(22) PCT Filed: Jul. 28, 2022

(86) PCT No.: PCT/CN2022/108614
§ 371 (c)(1),
(2) Date: Feb. 1, 2024

(87) PCT Pub. No.: WO2023/011311
PCT Pub. Date: Feb. 9, 2023

(65) Prior Publication Data

US 2024/0357362 A1 Oct. 24, 2024

(30) Foreign Application Priority Data

Aug. 3, 2021 (CN) ......................... 202110884566.5

(51) Int. Cl.
*H04W 12/72* (2021.01)
*H04L 9/40* (2022.01)
*H04W 48/18* (2009.01)

(52) U.S. Cl.
CPC ......... *H04W 12/72* (2021.01); *H04L 63/0892* (2013.01); *H04W 48/18* (2013.01)

(58) Field of Classification Search
CPC ..... H04W 12/72; H04W 48/18; H04W 12/06; H04W 12/08; H04W 76/11; H04L 63/0892; H04L 12/12
(Continued)

(56) References Cited

U.S. PATENT DOCUMENTS

2020/0221541 A1 7/2020 Yan
2021/0105196 A1 4/2021 Dao et al.
(Continued)

FOREIGN PATENT DOCUMENTS

CN 110933711 A 3/2020
CN 112291784 A 1/2021
(Continued)

OTHER PUBLICATIONS

ZTE, Replacing AUSF by NSSAAF to support NSSAA, 3GPP TSG-WG SA2 Meeting #139E, e-meeting, Jun. 1-5, 2020 (Phase-1).
(Continued)

*Primary Examiner* — Don N Vo
(74) *Attorney, Agent, or Firm* — Price Heneveld LLP

(57) ABSTRACT

The present disclosure provides a network element selection method, and apparatus, and network elements. The method includes: selecting, by a first network element, a network slice-specific authentication and authorization function (NS-SAAF) network element according to first information; wherein the first information includes at least one of the
(Continued)

selecting a network slice-specific authentication and authorization function (NSSAAF) network element according to first information;
wherein the first information includes at least one of the following:
single network slice selection assistance information (S-NSSAI) for a network slice;
a home network identifier in a subscription permanent identifier (SUPI);
a data network name (DNN);
a generic public subscription identifier (GPSI);
a subscription permanent identifier (SUPI);
a subscription concealed identifier (SUCI);
an external group ID;
an internal group ID;
and a routing identifier.

101 following: S-NSSAI for a network slice; a home network identifier in a subscription permanent identifier (SUPI); a data network name (DNN); a generic public subscription identifier (GPSI); a subscription permanent identifier (SUPI); an external group ID; an internal group ID; and a routing identifier.

18 Claims, 5 Drawing Sheets

(58) Field of Classification Search
USPC .......................................................... 455/411
See application file for complete search history.

(56) References Cited

U.S. PATENT DOCUMENTS

| | | | | |
|---|---|---|---|---|
| 2022/0132311 | A1 | 4/2022 | Zhu et al. | |
| 2023/0319556 | A1* | 10/2023 | Wu | H04L 9/0869 |
| 2023/0353990 | A1* | 11/2023 | Xu | H04W 88/08 |
| 2024/0107417 | A1* | 3/2024 | Chen | H04W 8/08 |
| 2025/0132901 | A1* | 4/2025 | Chen | G06F 21/6245 |

FOREIGN PATENT DOCUMENTS

| | | | |
|---|---|---|---|
| CN | 12969175 | A | 6/2021 |
| WO | 202190279 | A1 | 5/2021 |
| WO | 2021089703 | A1 | 5/2021 |

OTHER PUBLICATIONS

Ericsson, Handling of AAA-S address in NSSAA, 3GPP TSG-SA2 # 141E (e-meeting) S2-2007301, Oct. 12-23, 2020.

ZTE, "Pseudo-CR on Nnssaaf Interface—Data Model", 3GPP TSG-CT WG4 Meeting #98e, C4-203086, E-meeting, Jun. 2-12, 2020.

Vivo, "Remove AUSF from slice authentication procedure", 3GPP TSG-SA WG2 Meeting #135, S2-1908919, Split (Croatia), Oct. 14-18, 2019.

Nokia, Nokia Shanghai Bell, "Draft CR for Clause x.x.4 of eNS living CR", 3GPP TSG-SA3 Meeting #98e, S3-200118, e-meeting, Mar. 2-6, 2020.

"3rd Generation Partnership Project; Technical Specification Group Services and System Aspects; System architecture for the 5G System (5GS); Stage 2 (Release 17)", 3GPP TS 23.501 V17.1.1 (Jun. 2021), Valbonne, France.

Catt, Ericsson, Huawei, Nokia, Nokia Shanghai Bell, "Interaction between AUSF and AAA Server", SA WG2 Meeting #145E e-meeting, S2-2105010, Elbonia, May 17-28, 2021.

"3rd Generation Partnership Project; Technical Specification Group Services and System Aspects; Security aspects; Study on security aspects of network slicing enhancement (Release 16)", 3GPP TR 33.813 V16.0.0 (Jul. 2020), Valbonne, France.

Zte et al., "Replacing AUSF by NSSAAF to support NSSAA", 3GPP TSG-WG SA2 Meeting #139E e-meeting, S2-2003743 (revision of S2-200xxxx), Elbonia, Jun. 1-5, 2020 (Phase-1).

* cited by examiner

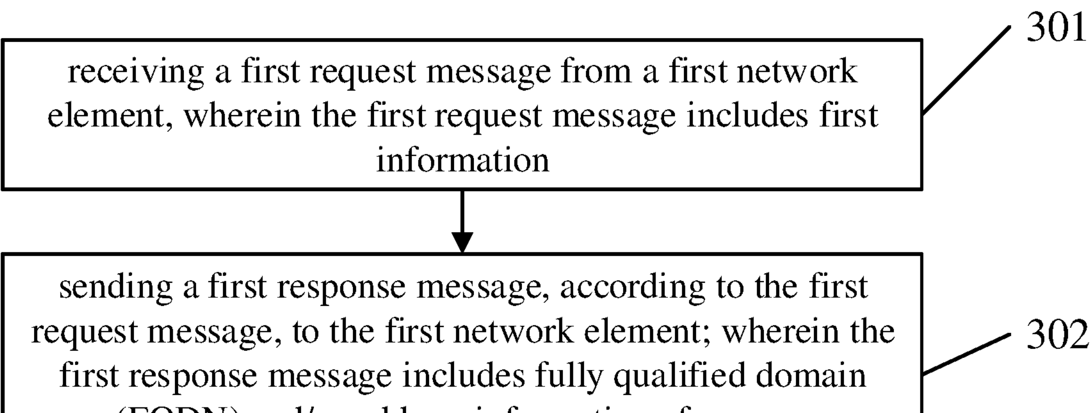

Fig. 3 receiving authorization request message from a first network element, wherein the authorization request message includes target address information, wherein the target address information is of one or a group of AAA servers corresponding to a network slice requested by a user equipment

401

Fig. 4 sending an authorization request message to a network slice-specific authentication and authorization function (NSSAAF) network element, wherein the authorization request message includes target address information, wherein the target address information is of one or a group of AAA servers corresponding to a network slice requested by a user equipment

NETWORK ELEMENT SELECTION METHOD, INFORMATION TRANSMISSION METHOD, APPARATUSES, AND NETWORK ELEMENT

CROSS-REFERENCE TO RELATED APPLICATION

The present application is the U.S. national phase of PCT Application PCT/CN2022/108614 filed on Jul. 28, 2022, which claims priority to the Chinese patent application No. 202110884566.5 filed in China on Aug. 3, 2021, a disclosure of which is incorporated herein by reference in its entirety.

TECHNICAL FIELD

The present disclosure relates to the field of communication technology, in particular to a network element selection method, information transmission method, apparatuses and network elements.

BACKGROUND

Slice authentication and authorization: on the basis of the operator completing identity authentication, industry customers can also be allowed to flexibly control the access rights of related slices to meet the access control requirements of vertical industries with high security requirements for slices.

This function requires the Access and Mobility Management Function (AMF) to interact with the Authentication, Authorization, and Accounting (AAA) server through the Network Slice-Specific Authentication and Authorization (NSSAAF). However, in the current live network, the AMF can only use the local configuration or the Mobile Country Code (MCC) plus Mobile Network Code (MNC) to query the NSSAAF that the user needs to use from the Network Repository Function (NRF). And the NSSAAF can only select AAA-S/AAA-P based on the corresponding relationship between the locally configured Single-Network Slice Selection Assistance Information (S-NSSAI) and the service AAA (AAA-S)/proxy AAA (AAA-P).

With the increase of subsequent service volume, the number of NSSAAF deployments also increases. Purely based on local configuration will greatly increase the configuration workload. And when the network element deployment changes, it is necessary to manually adjusting the relevant mapping relationship on all NSSAAF in the whole network, which brings great difficulty to maintenance. If the NRF is used to query based on MCC plus MNC, because the granularity of MCC plus MNC is too coarse, it is necessary to configure the relevant mapping relationship on all NSSAAF in the whole network, which has a large configuration volume and is not conducive to service configuration and isolation based on slices on each NSSAAF network elements.

In addition, with the increase of subsequent service volume, the number of AAA-S/AAA-P deployed by a single customer also increases. There may be different levels of users within the customer, that is, two groups of users (such as gold users and ordinary users). So it is also necessary to implement the direction of different users to different AAA-S/AAA-P for selection, which can reduce the service configuration volume of AAA-S/AAA-P on the one hand, and can also achieve service isolation of different users on the other hand. But the above requirements are not supported in the current live network mechanism.

In summary, if NSSAAF is selected based on local configuration or MCC plus MNC and/or AAA-S/AAA-P is selected based on S-NSSAI, the granularity is too coarse and the service configuration is too complicated, which affects the subsequent slice authentication.

SUMMARY

Embodiments of the present disclosure provide a network element selection method, information transmission method, apparatuses, and network elements to solve the problem of overly coarse granularity in network element selection affecting slice authentication in the related technology.

To solve the above problem, an embodiment of the present disclosure provides a network element selection method, performed by a first network element, including:

- selecting a network slice-specific authentication and authorization function (NSSAAF) network element according to first information; wherein the first information includes at least one of the following:
- single network slice selection assistance information (S-NSSAI) for a network slice;
- a home network identifier in a subscription permanent identifier (SUPI);
- a data network name (DNN);
- a generic public subscription identifier (GPSI);
- a subscription permanent identifier (SUPI);
- a subscription concealed identifier (SUCI);
- an external group ID;
- an internal group ID;
- and a routing identifier.

Wherein the selecting the NSSAAF network element according to the first information includes:

- sending a first request message to a second network element, wherein the first request message includes the first information:
- receiving a first response message from the second network element, wherein the first response message includes fully qualified domain names (FQDN) and/or address information of one or a group of NSSAAF:
- selecting the NSSAAF according to the first response message and a predetermined selection strategy.

Wherein before the selecting the NSSAAF network element according to the first information, the method further includes:

- obtaining subscription information of user equipment from a third network element, wherein the subscription information carries target address information, wherein the target address information is of one or more authentication, authorization, and accounting (AAA) servers corresponding to the network slice.

Wherein after the selecting the NSSAAF network element, the method further includes:

- sending an authorization request message to the selected NSSAAF network element, wherein the authorization request message includes the target address information.

Wherein the authorization request message further includes at least one of the following:

- a GPSI;
- S-NSSAI for the network slice;
- extensible authentication protocol (EAP) information.

An embodiment of the present disclosure further provides an information transmission method, performed by a second network element, including:

receiving a first request message from a first network element, wherein the first request message includes first information: wherein the first information includes at least one of the following:

S-NSSAI for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier;

sending a first response message, according to the first request message, to the first network element: wherein the first response message includes fully qualified domain names (FQDN) and/or address information of one or a group of NSSAAF.

An embodiment of the present disclosure further provides an information transmission method, performed by a network slice-specific authentication and authorization function (NSSAAF) network element, including:

receiving authorization request message from a first network element, wherein the authorization request message includes target address information, wherein the target address information is of one or a group of AAA servers corresponding to a network slice requested by a user equipment.

Wherein the authorization request message further includes at least one of the following:

a GPSI;

S-NSSAI for the network slice;

extensible authentication protocol (EAP) information.

Wherein the method further includes:

selecting a corresponding AAA server for the user equipment according to the target address information.

wherein when the AAA servers include a fourth network element and a fifth network element, the method further includes:

sending an AAA protocol message to the fifth network element, wherein the AAA protocol message is forwarded to the fourth network element by the fifth network element; wherein the AAA protocol message carries the target address information.

Wherein when the AAA servers include a fourth network element, the method further includes:

sending an AAA protocol message to the fourth network element, wherein the AAA protocol message includes the target address information.

Wherein the AAA protocol message further includes at least one of the following:

a GPSI;

S-NSSAI for the network slice;

extensible authentication protocol (EAP) information, wherein the target address information is obtained from subscription information of the user equipment sent by the first network element from a third network element.

An embodiment of the present disclosure further provides an information transmission method, performed by a first network element, including:

sending an authorization request message to a network slice-specific authentication and authorization function (NSSAAF) network element, wherein the authorization request message includes target address information, wherein the target address information is of one or a group of AAA servers corresponding to a network slice requested by a user equipment.

Wherein the authorization request message further includes at least one of the following:

a GPSI;

S-NSSAI for the network slice;

extensible authentication protocol (EAP) information.

Wherein before the sending the authorization request message to the NSSAAF, the method further includes:

obtaining subscription information of the user equipment from a third network element, wherein the subscription information carries the target address information, wherein the target address information is of one or a group of AAA servers corresponding to the network slice.

An embodiment of the present disclosure further provides an information storage method, performed by a third network element, including:

storing subscription information of a user equipment, wherein the subscription information carries target address information, wherein the target address information is of one or a group of AAA servers corresponding to a network slice.

Wherein the method further includes:

sending the subscription information of the user equipment to a first network element.

An embodiment of the present disclosure further provides a network element selection apparatus, performed by a first network element, including:

a selecting module, configured to select a network slice-specific authentication and authorization function (NSSAAF) network element according to first information, wherein the first information includes at least one of the following:

single network slice selection assistance information (S-NSSAI) for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier.

An embodiment of the present disclosure further provides a first network element, including a processor and a transceiver, wherein the transceiver receives and sends data under the control of the processor, wherein the processor is configured to perform:

selecting a network slice-specific authentication and authorization function (NSSAAF) network element according to first information, wherein the first information includes at least one of the following:

single network slice selection assistance information (S-NSSAI) for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier.

An embodiment of the present disclosure further provides an information transmission apparatus, performed by a second network element, including:

a first receiving module, configured to receive a first request message sent by a first network element, wherein the first request message includes first information; wherein the first information includes at least one of the following:

single network slice selection assistance information (S-NSSAI) for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier;

a first sending module, configured to send, according to the first request message, a first response message to the first network element; wherein the first response message includes fully qualified domain names (FQDN) and/or address information of one or a group of NSSAAF.

An embodiment of the present disclosure further provides a second network element, including a processor and a transceiver, wherein the transceiver receives and sends data under the control of the processor, wherein the processor is configured to perform:

receiving a first request message sent by a first network element, wherein the first request message includes first information: wherein the first information includes at least one of the following:

single network slice selection assistance information (S-NSSAI) for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier;

sending, according to the first request message, a first response message to the first network element; wherein the first response message includes fully qualified domain names (FQDN) and/or address information of one or a group of NSSAAF.

An embodiment of the present disclosure further provides an information transmission apparatus, performed by a NSSAAF network element, including:

a second receiving module, configured to receive an authorization request message from a first network element, wherein the authorization request message includes target address information, wherein the target address information is of one or a group of AAA servers corresponding to a network slice requested by a user equipment.

An embodiment of the present disclosure further provides a NSSAAF network element, including a processor and a transceiver, wherein the transceiver receives and sends data under the control of the processor, wherein the processor is configured to perform:

receiving an authorization request message from a first network element, wherein the authorization request message includes target address information, wherein the target address information is of one or a group of AAA servers corresponding to a network slice requested by a user equipment.

An embodiment of the present disclosure further provides a first network element, including:

a second sending module, configured to send an authorization request message to a NSSAAF network element, wherein the authorization request message includes target address information, wherein the target address information is of one or a group of AAA servers corresponding to a network slice requested by a user equipment.

An embodiment of the present disclosure further provides a first network element, including a processor and a transceiver, wherein the transceiver receives and sends data under the control of the processor, wherein the processor is configured to perform:

sending an authorization request message to a NSSAAF network element, wherein the authorization request message includes target address information, wherein the target address information is of one or a group of AAA servers corresponding to a network slice requested by a user equipment.

An embodiment of the present disclosure further provides a third network element, including:

a storing module, configured to store subscription information of a user equipment, wherein the subscription information carries target address information, wherein the target address information is of one or a group of AAA servers corresponding to a network slice.

An embodiment of the present disclosure further provides a processor and a transceiver, wherein the transceiver receives and sends data under the control of the processor, wherein the processor is configured to perform:

storing subscription information of a user equipment, wherein the subscription information carries target address information, wherein the target address information is of one or a group of AAA servers corresponding to a network slice.

An embodiment of the present disclosure further provides a network element, including a memory, a processor, and a program stored in the memory and capable of running on the processor, wherein the processor is configured to execute the program to implement the steps in the foregoing network element selection method, or, to implement the steps in the foregoing information transmission method or information storage method.

An embodiment of the present disclosure further provides a computer-readable storage medium storing therein a computer program, wherein the computer program is configured to be executed by a processor to implement the steps in the foregoing network element selection method, or, to implement the steps in the foregoing information transmission method or information storage method.

The foregoing technical solution of the present disclosure has at least the following beneficial effects.

In the network element selection method, information transmission method, apparatuses, and network elements, the AMF obtains the NSSAAF to be used by the current user equipment based on at least one of S-NSSAI, the home network identifier in SUPI, DNN, GPSI, SUPI, SUCI, external group ID, internal group ID, and routing identifier, which refines the granularity of selecting NSSAAF, thereby enabling service isolation on multiple NSSAAF network elements based on the slice of the user equipment.

BRIEF DESCRIPTION OF THE DRAWINGS

FIG. 3 is a flowchart of steps of an information transmission method according to an embodiment of the present disclosure;

FIG. 4 is another flowchart of steps of an information transmission method according to an embodiment of the present disclosure;

FIG. 5 is another flowchart of steps of an information transmission method according to an embodiment of the present disclosure;

DETAILED DESCRIPTION

In order to provide a clear understanding of the technical issues addressed, technical solutions, and the advantages of the present disclosure, the following will describe in detailed with reference to the accompanying drawings and specific embodiments.

Figure 1:
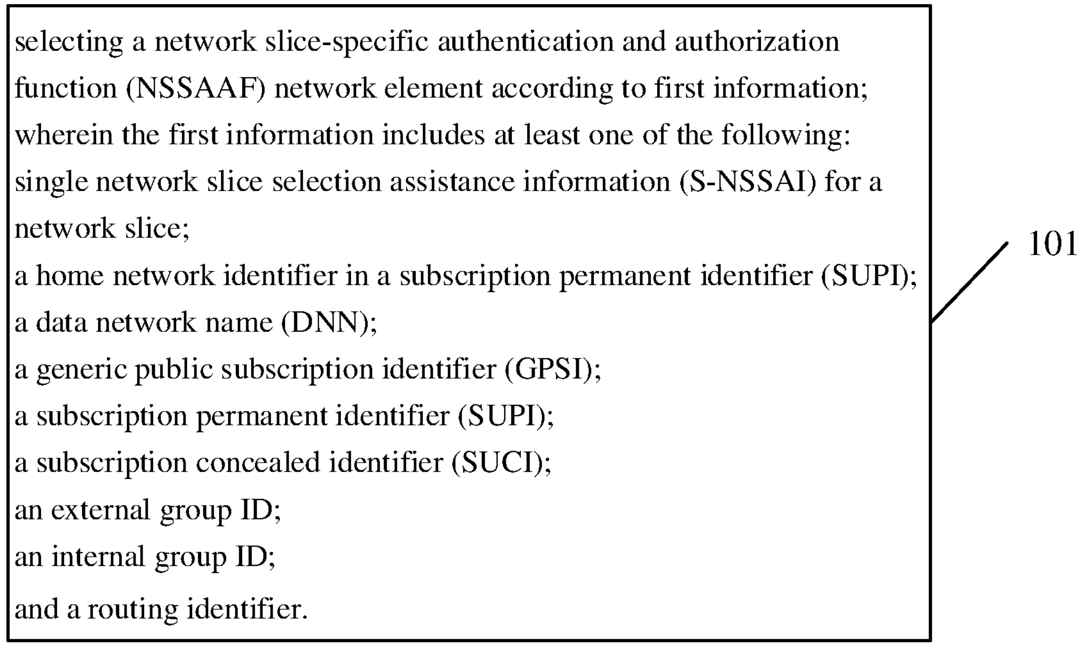
FIG. 1 is a schematic diagram of steps of an network element selection method according to an embodiment of the present disclosure.

As shown in FIG. 1, an embodiment of the present disclosure provides a network element selection method, performed by a first network element, including:

a step 101: selecting a network slice-specific authentication and authorization function (NSSAAF) network element according to first information; wherein the first information includes at least one of the following:

single network slice selection assistance information (S-NSSAI) for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier.

Optionally, the first network element according to the embodiment of the present disclosure includes: an access and mobility management function (AMF) network element, or, a session management function (SMF) network element, or other network elements with management functions. It is to be noted that the internal group ID is a very necessary NSSAAF network element selection parameter, because the granularity when selecting NSSAAF based on slices is still relatively coarse (generally, one slice is usually corresponding to one or a group of services), while the granularity when selecting NSSAAF based on SUPI (which is usually corresponds to one user) is too fine. If it is needed to further refine management of users in the slice (for example, users are divided into high-level, middle-level and low-level users, and different NSSAAF or NSSAAF groups are selected for users of different levels), then the internal group ID is required to implement NSSAAF network element selection, which is also an important innovation point of the present application.

In at least one of the embodiments of the present disclosure, the step 101 includes:

sending a first request message to a second network element, wherein the first request message includes the first information;

receiving a first response message from the second network element, wherein the first response message includes fully qualified domain names (FQDN) and/or address information of one or a group of NSSAAF;

selecting the NSSAAF according to the first response message and a predetermined selection strategy.

Optionally, the second network element according to the embodiment of the present disclosure includes: NF repository function (NRF) network element, or, service control point (SCP) network element, or other network elements with storage functions.

For example, the address information of NSSAAF includes the IP address of NSSAAF.

Optionally, the first request message may be referred to as network function discovery request (Nnrf_NFDiscovery_Request) message: correspondingly, the first response message may be referred to as a network function discovery response (Nnrf_NFDiscovery_Response) message.

As an optional embodiment, the first information includes at least one of the following:

a generic public subscription identifier (GPSI);

a subscription permanent identifier (SUPI);

a subscription concealed identifier (SUCI);

an external group ID;

an internal group ID;

and a routing identifier.

Figure 2:
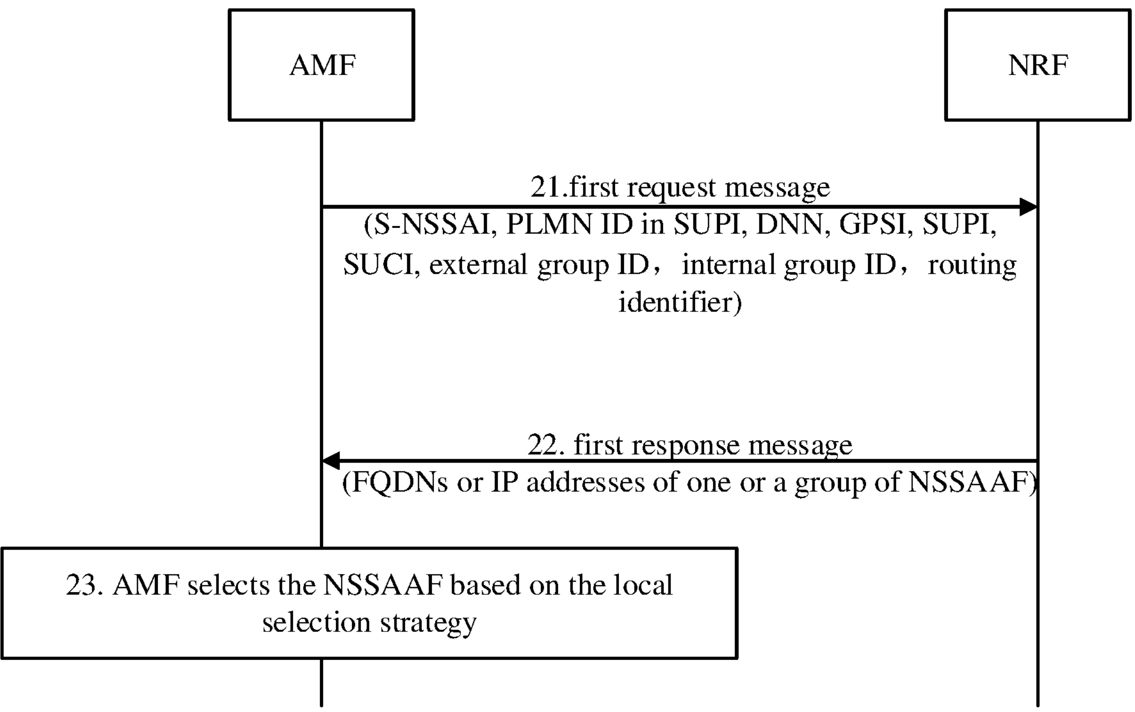
FIG. 2 is a schematic diagram of a network element interaction of a network element selection method according to an embodiment of the present disclosure.

For example, the selection process for NSSAAF based on the first information is shown in FIG. 2;

a step 21: the AMF sends a first request message to the NRF requesting it to query local information, wherein the first request message carries S-NSSAI, public land mobile network (PLMN) identifier in the SUPI, DNN, GPSI, SUPI, SUCI, external group ID, internal group ID, and routing identifier;

a step 22: the NRF returns to the AMF with a first response message wherein the first response message includes FQDNs or IP addresses of one or a group of NSSAAF;

a step 23: the AMF selects the NSSAAF based on the local selection strategy.

In at least one of the embodiments of the present disclosure, before the step 101, the method further includes:

obtaining subscription information of user equipment from a third network element, wherein the subscription information carries target address information, wherein the target address information is of one or more AAA servers corresponding to the network slice.

In the embodiment of the present disclosure, the third network element adds target address information in the subscription information, wherein the network slice is identified by S-NSSAI, that is, the address information of the AAA server corresponding to S-NSSAI is added in the subscription information. The third network element returns the target address information related to the slice to the first network element. The target address information is also referred to as NSSAAAaaAddress.

Optionally, the third network element according to the embodiment of the present disclosure includes: a unified data management (UDM) network element, a unified data repository (UDR) network element, an authentication server function (AUSF) network element, or other network element capable of storing subscription information of a user equipment.

After successful initial authentication of the user equipment, the AMF determines whether to initiate slice-level authentication based on the subscription information of the user equipment retrieved from either the UDM or AUSF. The subscription information carries the address information of the AAA server corresponding to the slice.

Continuing from the foregoing embodiment, in at least one of the embodiments of the present disclosure, after the step 101, the method further includes:

sending an authorization request message (the authorization request message may be referred to as the Nnssaaf_NSSAA_Authenticate Request) to the selected NSSAAF network element, wherein the authorization request message includes the target address information.

Optionally, the authorization request message further includes at least one of the following:

a GPSI;

S-NSSAI for the network slice;

extensible authentication protocol (EAP) information.

Further, the NSSAAF network element, based on the target address information in the authorization request message, selects the corresponding AAA server for the user and carries out the subsequent slice secondary authentication process.

In summary, in embodiments of the present disclosure, the AMF obtains the NSSAAF to be used by the current user equipment based on at least one of S-NSSAI, the home network identifier in SUPI, DNN, GPSI, SUPI, SUCI, external group ID, internal group ID, and routing identifier, which refines the granularity of selecting NSSAAF, thereby enabling service isolation on multiple NSSAAF network elements based on the slice of the user equipment: Furthermore, the AMF obtains the address information of the AAA server corresponding to each slice from the subscription information and conveys it to the NSSAAF via relevant messages. The NSSAAF, based on the received AAA server address information, selects the corresponding AAA server, which refines the granularity of AAA server selection, thereby facilitating the distribution of users of varying levels to different AAA servers.

As shown in FIG. 3, an embodiment of the present disclosure further provides an information transmission method, performed by a second network element, including:

a step 301: receiving a first request message from a first network element, wherein the first request message includes first information; wherein the first information includes at least one of the following:

S-NSSAI for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier;

a step 302: sending a first response message, according to the first request message, to the first network element: wherein the first response message includes fully qualified domain names (FQDN) and/or address information of one or a group of NSSAAF.

Optionally, the first request message is used to request the NRF to query local information: the second network element queries local information based on the first request message, and obtains the FQDNs and/or address information of one or a group of NSSAAF corresponding to the first information.

For example, the address information of NSSAAF includes: the IP address of NSSAAF.

Optionally, the first network element according to the embodiment of the present disclosure includes: an AMF network element, or, a SMF network element, or other network elements with management functions.

Optionally, the first request message may be referred to as network function discovery request (Nnrf_NFDiscovery_Request) message: correspondingly, the first response message may be referred to as a network function discovery response (Nnrf_NFDiscovery_Response) message.

As an optional embodiment, the first information includes at least one of the following:

a generic public subscription identifier (GPSI);

a subscription permanent identifier (SUPI);

a subscription concealed identifier (SUCI);

an external group ID;

an internal group ID;

and a routing identifier.

In summary, in embodiments of the present disclosure, the AMF obtains the NSSAAF to be used by the current user equipment based on at least one of S-NSSAI, the home network identifier in SUPI, DNN, GPSI, SUPI, SUCI, external group ID, internal group ID, and routing identifier, which refines the granularity of selecting NSSAAF, thereby enabling service isolation on multiple NSSAAF network elements based on the slice of the user equipment.

As shown in FIG. 4, an embodiment of the present disclosure further provides an information transmission method, performed by a network slice-specific authentication and authorization function (NSSAAF) network element, including:

a step 401: receiving authorization request message (the authorization request message may be referred to as the Nnssaaf_NSSAA_Authenticate Request) from a first network element, wherein the authorization request message includes target address information, wherein the target address information is of one or a group of AAA servers corresponding to a network slice requested by a user equipment. Optionally, the authorization request message is used to trigger the slicing authentication process.

Optionally, the target address information is also referred to as NSSAAAaaAddress.

Optionally, the authorization request message further includes at least one of the following:

a GPSI;

S-NSSAI for the network slice;

extensible authentication protocol (EAP) information.

Optionally, the first network element according to the embodiment of the present disclosure includes: an AMF network element, or, a SMF network element, or other network elements with management functions.

Wherein the target address information is obtained from subscription information of the user equipment sent by the first network element from a third network element.

Optionally, the third network element according to the embodiment of the present disclosure includes: a UDM network element, a UDR network element, an AUSF network element, or other network element capable of storing subscription information of a user equipment.

Furthermore, in the foregoing embodiment of the present disclosure, the method further includes:

selecting a corresponding AAA server for the user equipment according to the target address information.

In other words, the NSSAAF network element, based on the target address information in the authorization request message, selects the corresponding AAA server for the user and carries out the subsequent slice-level secondary authentication process.

In the foregoing embodiment of the present disclosure, when the AAA servers include a fourth network element and a fifth network element, the method further includes:

sending an AAA protocol message to the fifth network element, wherein the AAA protocol message is forwarded to the fourth network element by the fifth network element: wherein the AAA protocol message carries the target address information.

Wherein the fourth network element is the AAA-S server, that is, the service AAA server, which can also be directly referred to as the AAA server: the fifth network element is the AAA-P server, that is, the proxy AAA server.

Or, when the AAA servers include a fourth network element (in other words, when the AAA servers do not include the proxy AAA server), the method further includes:

sending an AAA protocol message to the fourth network element, wherein the AAA protocol message includes the target address information.

As an optional embodiment, the AAA protocol message further includes at least one of the following:

a GPSI;

S-NSSAI for the network slice;

extensible authentication protocol (EAP) information.

In summary, in embodiments of the present disclosure, the AMF obtains the address information of the AAA server corresponding to each slice from the subscription information and conveys it to the NSSAAF via relevant messages. The NSSAAF, based on the received AAA server address information, selects the corresponding AAA server, which refines the granularity of AAA server selection, thereby facilitating the distribution of users of varying levels to different AAA servers.

As shown in FIG. 5, an embodiment of the present disclosure further provides an information transmission method, performed by a first network element, including:

a step 501: sending an authorization request message (the authorization request message may be referred to as the Nnssaaf_NSSAA_Authenticate Request) to a network slice-specific authentication and authorization function (NSSAAF) network element, wherein the authorization request message includes target address information, wherein the target address information is of one or a group of AAA servers corresponding to a network slice requested by a user equipment.

Optionally, the authorization request message is used to trigger the slicing authentication process.

Optionally, the authorization request message further includes at least one of the following:

a GPSI;

S-NSSAI for the network slice;

extensible authentication protocol (EAP) information.

Further, the NSSAAF network element, based on the target address information in the authorization request message, selects the corresponding AAA server for the user and carries out the subsequent slice secondary authentication process.

In at least one of embodiments of the present disclosure, before the sending the authorization request message to the NSSAAF, the method further includes:

obtaining subscription information of the user equipment from a third network element, wherein the subscription information carries the target address information, wherein the target address information is of one or a group of AAA servers corresponding to the network slice.

In the embodiment of the present disclosure, the third network element adds target address information in the subscription information, wherein the network slice is identified by S-NSSAI, that is, the address information of the AAA server corresponding to S-NSSAI is added in the subscription information. The third network element returns the target address information related to the slice to the first network element. The target address information is also referred to as NSSAAAaaAddress.

Optionally, the third network element according to the embodiment of the present disclosure includes: a UDM network element, a UDR network element, an AUSF network element, or other network element capable of storing subscription information of a user equipment.

After successful initial authentication of the user equipment, the AMF determines whether to initiate slice-level authentication based on the subscription information of the user equipment retrieved from either the UDM or AUSF. The subscription information carries the address information of the AAA server corresponding to the slice.

In summary, in embodiments of the present disclosure, the AMF obtains the address information of the AAA server corresponding to each slice from the subscription information and conveys it to the NSSAAF via relevant messages. The NSSAAF, based on the received AAA server address information, selects the corresponding AAA server, which refines the granularity of AAA server selection, thereby facilitating the distribution of users of varying levels to different AAA servers.

An embodiment of the present disclosure further provides an information storage method, performed by a third network element, including:

storing subscription information of a user equipment, wherein the subscription information carries target address information, wherein the target address information is of one or a group of AAA servers corresponding to a network slice.

Optionally, the third network element according to the embodiment of the present disclosure includes: a UDM network element, a UDR network element, an AUSF network element, or other network element capable of storing subscription information of a user equipment.

Optionally, in the embodiment of the present disclosure, the subscription information of the user equipment, in addition to carrying relevant information of the related technology, also carries the address information of one or a group of AAA servers corresponding to the network slice; for example, this network slice may be the network slice subscribed by the user.

In at least one of the embodiments of the present disclosure, the method further includes:

sending the subscription information of the user equipment to the first network element, which allows the first network element to pass the address information of the AAA server corresponding to each network slice obtained from the subscription information to NSSAAF to assist NSSAAF in selecting the AAA server.

In summary, in embodiments of the present disclosure, the UDM or AUSFU sends the subscription information to the AMF. The AMF obtains the address information of the AAA server corresponding to each slice from the subscription information and conveys it to the NSSAAF via relevant messages. The NSSAAF, based on the received AAA server address information, selects the corresponding AAA server, which refines the granularity of AAA server selection, thereby facilitating the distribution of users of varying levels to different AAA servers.

Figure 6:
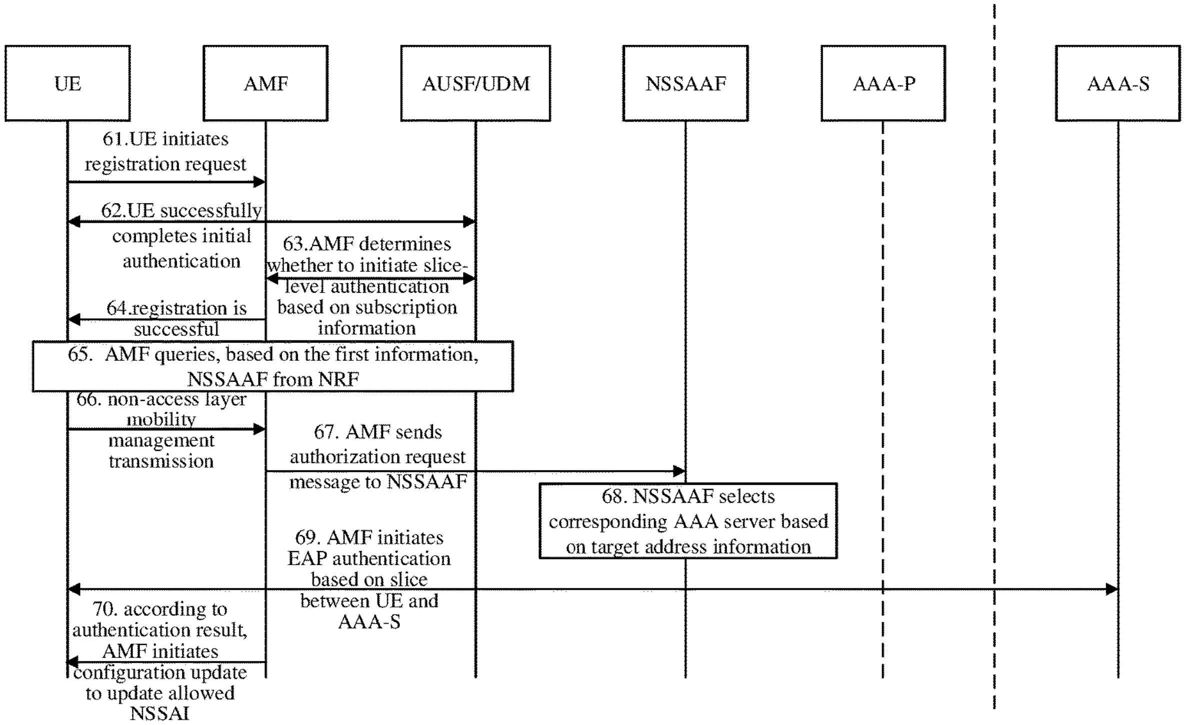
FIG. 6 is a schematic process diagram of a slice authentication according to an embodiment of the present disclosure.

As shown in FIG. 6, the slice authentication procedure according to the embodiment of the present disclosure is as follows:

a step 61: the user equipment (UE) initiates a registration request, carrying the network slice selection assistance information (NSSAI) and UE capability information;

a step 62: the UE successfully completes the initial authentication;

a step 63: the AMF determines whether to initiate slice-level authentication based on the subscription information. The subscription information includes the address information of one or a group of AAA servers corresponding to the network slice;

a step 64: registration is successful, carrying the permitted NSSAI and extended NSSAI;

a step 65: the AMF queries, based on the first information, the NSSAAF from the NRF. The first information includes at least one of: S-NSSAI, the home network identifier in SUPI, DNN, GPSI, SUPI, SUCI, external group ID, internal group ID, and routing identifier;

a step 66: non-access layer mobility management transmission is performed;

a step 67: the AMF sends an authorization request message to the NSSAAF, carrying the target address information, EAP information, GPSI, S-NSSAI, etc. The target address information is of one or a group of AAA servers corresponding to a network slice requested by a user equipment;

a step 68: the NSSAAF selects the corresponding AAA server based on the target address information;

a step 69: the AMF initiates EAP authentication based on the slice between the UE and the AAA-S;

a step 70: according to the authentication result, the AMF initiates a configuration update to update the allowed NSSAI.

In embodiments of the present disclosure, the AMF obtains the NSSAAF to be used by the current user equipment based on at least one of S-NSSAI, the home network identifier in SUPI, DNN, GPSI, SUPI, SUCI, external group ID, internal group ID, and routing identifier, which refines the granularity of selecting NSSAAF, thereby enabling service isolation on multiple NSSAAF network elements based on the slice of the user equipment: furthermore, the AMF obtains the address information of the AAA server corresponding to each slice from the subscription information and conveys it to the NSSAAF via relevant messages. The NSSAAF, based on the received AAA server address information, selects the corresponding AAA server, which refines the granularity of AAA server selection, thereby facilitating the distribution of users of varying levels to different AAA servers.

Figure 7:
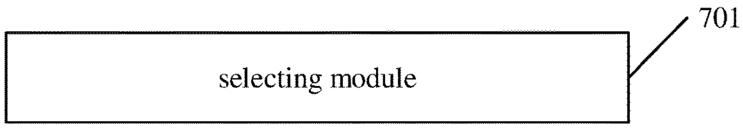
FIG. 7 is a schematic structural diagram of a network element selection apparatus according to an embodiment of the present disclosure.
Figure 8:
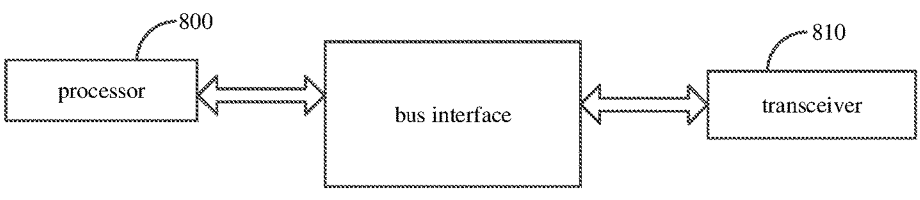
FIG. 8 is a schematic structural diagram of a first network element according to an embodiment of the present disclosure.

As shown in FIG. 7, an embodiment of the present disclosure further provides a network element selecting apparatus, performed by a first network element, including:

a selecting module 701, configured to select a network slice-specific authentication and authorization function (NSSAAF) network element according to first information, wherein the first information includes at least one of the following:

single network slice selection assistance information (S-NSSAI) for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier.

As an optional embodiment, the selecting module includes:

a first submodule, configure to send a first request message to a second network element, wherein the first request message includes the first information;

a second submodule, configure to receive a first response message from the second network element, wherein the first response message includes FQDNs and/or address information of one or a group of NSSAAF;

a third submodule, configure to selecting the NSSAAF according to the first response message and a predetermined selection strategy.

As an optional embodiment, the first information includes at least one of the following:

S-NSSAI for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier.

As an optional embodiment, the apparatus further includes:

an obtaining module, configure to obtain subscription information of the user equipment from a third network element, wherein the subscription information carries the target address information, wherein the target address information is of one or a group of AAA servers corresponding to the network slice.

As an optional embodiment, the apparatus further includes:

a third sending module, configured to send an authorization request message to the selected NSSAAF network element, wherein the authorization request message includes the target address information.

As an optional embodiment, the authorization request message further includes at least one of the following:

a GPSI;

S-NSSAI for the network slice;

extensible authentication protocol (EAP) information.

In embodiments of the present disclosure, the AMF obtains the NSSAAF to be used by the current user equipment based on at least one of S-NSSAI, the home network identifier in SUPI, DNN, GPSI, SUPI, SUCI, external group ID, internal group ID, and routing identifier, which refines the granularity of selecting NSSAAF, thereby enabling service isolation on multiple NSSAAF network elements based on the slice of the user equipment: furthermore, the AMF obtains the address information of the AAA server corresponding to each slice from the subscription information and conveys it to the NSSAAF via relevant messages. The NSSAAF, based on the received AAA server address information, selects the corresponding AAA server, which refines the granularity of AAA server selection, thereby facilitating the distribution of users of varying levels to different AAA servers.

It should be noted that the first network element according to embodiments of the present disclosure is capable of executing the foregoing network element selection method. Then all embodiments of the foregoing network element selection method are applicable to this first network element, and can achieve the same or similar beneficial effects.

Figure 9:
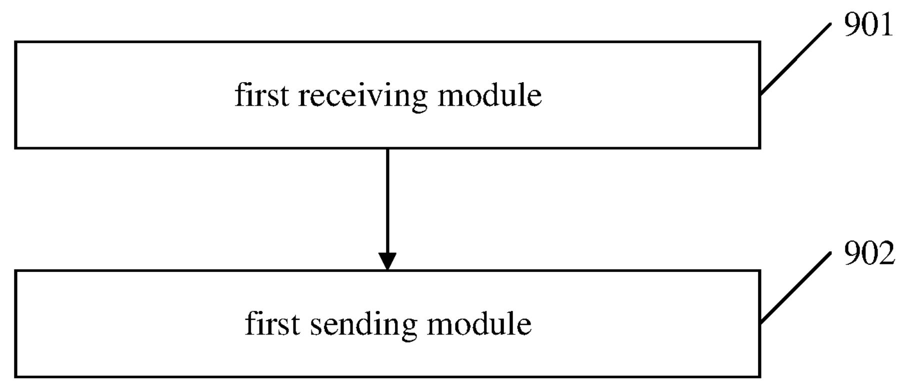
FIG. 9 is a schematic structural diagram of an information transmission apparatus according to an embodiment of the present disclosure.

As shown in FIG. 9, an embodiment of the present disclosure further provides an information transmission apparatus, performed by a second network element, including:

a first receiving module 901, configured to receive a first request message sent by a first network element, wherein the first request message includes first information: wherein the first information includes at least one of the following:

single network slice selection assistance information (S-NSSAI) for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier;

a first sending module 902, configured to send, according to the first request message, a first response message to the first network element: wherein the first response message includes FQDNs and/or address information of one or a group of NSSAAF.

As an optional embodiment, the first information includes at least one of the following:

S-NSSAI for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier.

In embodiments of the present disclosure, the AMF obtains the NSSAAF to be used by the current user equipment based on at least one of S-NSSAI, the home network identifier in SUPI, DNN, GPSI, SUPI, SUCI, external group ID, internal group ID, and routing identifier, which refines the granularity of selecting NSSAAF, thereby enabling service isolation on multiple NSSAAF network elements based on the slice of the user equipment.

It should be noted that the information transmission apparatus according to embodiments of the present disclosure is capable of executing the foregoing information transmission method. Then all embodiments of the foregoing information transmission method are applicable to this apparatus, and can achieve the same or similar beneficial effects.

Figure 10:
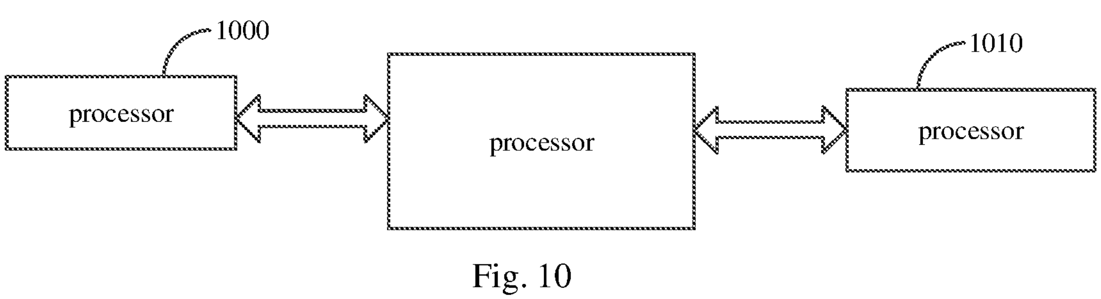
FIG. 10 is a schematic structural diagram of a second network element according to an embodiment of the present disclosure.

As shown in FIG. 10, an embodiment of the present disclosure further provides a second network element, including a processor 1000 and a transceiver 1010, wherein the transceiver 1010 receives and sends data under the control of the processor 1000, wherein the processor is configured to perform:

receiving a first request message sent by a first network element, wherein the first request message includes first information; wherein the first information includes at least one of the following:

S-NSSAI for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier;

sending, according to the first request message, a first response message to the first network element; wherein the first response message includes fully qualified domain names (FQDN) and/or address information of one or a group of NSSAAF.

As an optional embodiment, the first information includes at least one of the following:

S-NSSAI for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier.

In embodiments of the present disclosure, the AMF obtains the NSSAAF to be used by the current user equipment based on at least one of S-NSSAI, the home network identifier in SUPI, DNN, GPSI, SUPI, SUCI, external group ID, internal group ID, and routing identifier, which refines the granularity of selecting NSSAAF, thereby enabling service isolation on multiple NSSAAF network elements based on the slice of the user equipment.

It should be noted that the second network element according to embodiments of the present disclosure is capable of executing the foregoing information transmission method. Then all embodiments of the foregoing information transmission method are applicable to this second network element, and can achieve the same or similar beneficial effects.

Figure 11:
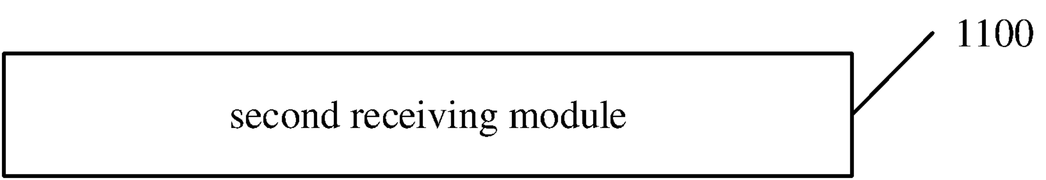
FIG. 11 is another schematic structural diagram of an information transmission apparatus according to an embodiment of the present disclosure.

As shown in FIG. 11, an embodiment of the present disclosure further provides an information transmission apparatus, performed by a NSSAAF network element, including:

a second receiving module 1100, configured to receive an authorization request message from a first network element, wherein the authorization request message includes target address information, wherein the target address information is of one or a group of AAA servers corresponding to a network slice requested by a user equipment.

As an optional embodiment, the authorization request message further includes at least one of the following:

a GPSI;

S-NSSAI for the network slice;

extensible authentication protocol (EAP) information.

As an optional embodiment, the apparatus further includes:

a second selecting module, configured to select a corresponding AAA server for the user equipment according to the target address information.

As an optional embodiment, when the AAA servers include a fourth network element and a fifth network element, the apparatus further includes:

a fourth sending module, configured to send an AAA protocol message to the fifth network element, wherein the AAA protocol message is forwarded to the fourth network element by the fifth network element: wherein the AAA protocol message carries the target address information.

As an optional embodiment, when the AAA servers include a fourth network element, the apparatus further includes:

a fifth sending module, configured to send an AAA protocol message to the fourth network element, wherein the AAA protocol message includes the target address information.

As an optional embodiment, the AAA protocol message further includes at least one of the following:

a GPSI;

S-NSSAI for the network slice;

extensible authentication protocol (EAP) information.

In embodiments of the present disclosure, the AMF obtains the address information of the AAA server corresponding to each slice from the subscription information and conveys it to the NSSAAF via relevant messages. The NSSAAF, based on the received AAA server address information, selects the corresponding AAA server, which refines the granularity of AAA server selection, thereby facilitating the distribution of users of varying levels to different AAA servers.

It should be noted that the information transmission apparatus according to embodiments of the present disclosure is capable of executing the foregoing information transmission method. Then all embodiments of the foregoing information transmission method are applicable to this apparatus, and can achieve the same or similar beneficial effects.

Figure 12:
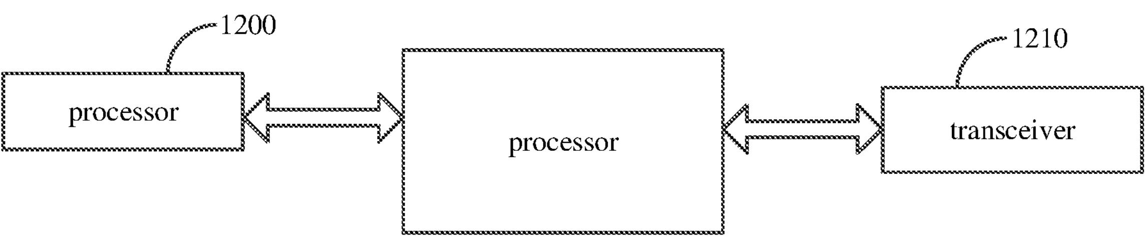
FIG. 12 is a schematic structural diagram of a NSSAAF network element according to an embodiment of the present disclosure.

As shown in FIG. 12, an embodiment of the present disclosure further provides a NSSAAF network element, including a processor 1200 and a transceiver 1210, wherein the transceiver 12010 receives and sends data under the control of the processor 1200, wherein the processor 1200 is configured to perform:

receiving an authorization request message from a first network element, wherein the authorization request message includes target address information, wherein the target address information is of one or a group of AAA servers corresponding to a network slice requested by a user equipment.

As an optional embodiment, the authorization request message further includes at least one of the following:

a GPSI;

S-NSSAI for the network slice;

extensible authentication protocol (EAP) information.

As an optional embodiment, the processor is further configured to perform:

selecting a corresponding AAA server for the user equipment according to the target address information.

As an optional embodiment, when the AAA servers include a fourth network element and a fifth network element, the processor is further configured to perform:

sending an AAA protocol message to the fifth network element, wherein the AAA protocol message is forwarded to the fourth network element by the fifth network element: wherein the AAA protocol message carries the target address information.

As an optional embodiment, when the AAA servers include a fourth network element, the processor is further configured to perform:

sending an AAA protocol message to the fourth network element, wherein the AAA protocol message includes the target address information.

As an optional embodiment, the AAA protocol message further includes at least one of the following:

a GPSI;

S-NSSAI for the network slice;

extensible authentication protocol (EAP) information.

In embodiments of the present disclosure, the AMF obtains the address information of the AAA server corresponding to each slice from the subscription information and conveys it to the NSSAAF via relevant messages. The NSSAAF, based on the received AAA server address information, selects the corresponding AAA server, which refines the granularity of AAA server selection, thereby facilitating the distribution of users of varying levels to different AAA servers.

It should be noted that the NSSAAF network element according to embodiments of the present disclosure is capable of executing the foregoing information transmission method. Then all embodiments of the foregoing information transmission method are applicable to this NSSAAF network element, and can achieve the same or similar beneficial effects.

Figure 13:
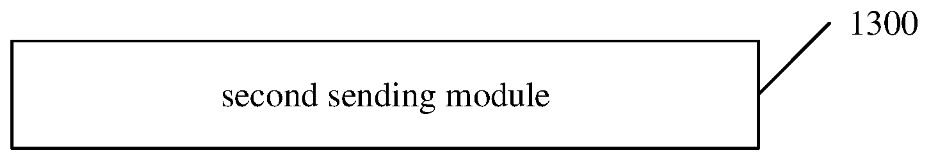
FIG. 13 is another schematic structural diagram of an information transmission apparatus according to an embodiment of the present disclosure.

As shown in FIG. 13, an embodiment of the present disclosure further provides an information transmission apparatus, performed by a first network element, including:

a second sending module 1300, configured to send an authorization request message to a NSSAAF network element, wherein the authorization request message includes target address information, wherein the target address information is of one or a group of AAA servers corresponding to a network slice requested by a user equipment.

As an optional embodiment, the authorization request message further includes at least one of the following:

a GPSI;

S-NSSAI for the network slice;

extensible authentication protocol (EAP) information.

As an optional embodiment, the apparatus further includes:

an obtaining module, configured to obtain subscription information of the user equipment from a third network element, wherein the subscription information carries the target address information, wherein the target address information is of one or a group of AAA servers corresponding to the network slice.

In embodiments of the present disclosure, the AMF obtains the address information of the AAA server corresponding to each slice from the subscription information and conveys it to the NSSAAF via relevant messages. The NSSAAF, based on the received AAA server address information, selects the corresponding AAA server, which refines the granularity of AAA server selection, thereby facilitating the distribution of users of varying levels to different AAA servers.

It should be noted that the information transmission apparatus according to embodiments of the present disclosure is capable of executing the foregoing information transmission method. Then all embodiments of the foregoing information transmission method are applicable to this apparatus, and can achieve the same or similar beneficial effects.

Figure 14:
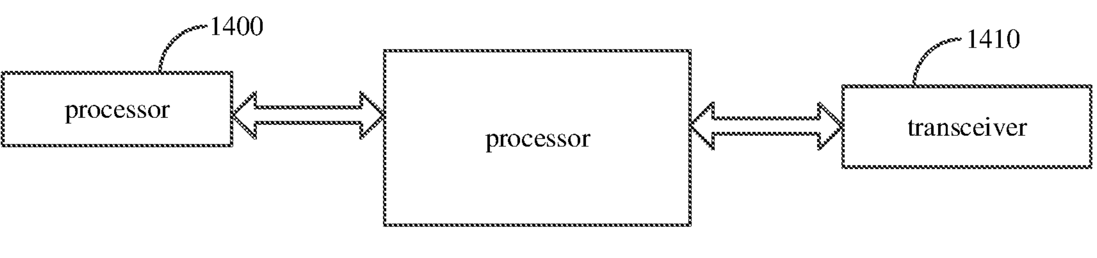
FIG. 14 is another schematic structural diagram of a first network element according to an embodiment of the present disclosure.

As shown in FIG. 14, an embodiment of the present disclosure further provides a first network element, including a processor 1400 and a transceiver 1410, wherein the transceiver 1410 receives and sends data under the control of the processor 1400, wherein the processor 1400 is configured to perform:

sending an authorization request message to a NSSAAF network element, wherein the authorization request message includes target address information, wherein the target address information is of one or a group of AAA servers corresponding to a network slice requested by a user equipment.

As an optional embodiment, the authorization request message further includes at least one of the following:

a GPSI;

S-NSSAI for the network slice;

extensible authentication protocol (EAP) information.

As an optional embodiment, the processor is further configured to perform:

obtaining subscription information of the user equipment from a third network element, wherein the subscription information carries the target address information, wherein the target address information is of one or a group of AAA servers corresponding to the network slice.

In embodiments of the present disclosure, the AMF obtains the address information of the AAA server corresponding to each slice from the subscription information and conveys it to the NSSAAF via relevant messages. The NSSAAF, based on the received AAA server address information, selects the corresponding AAA server, which refines the granularity of AAA server selection, thereby facilitating the distribution of users of varying levels to different AAA servers.

It should be noted that the first network element according to embodiments of the present disclosure is capable of executing the foregoing information transmission method. Then all embodiments of the foregoing information transmission method are applicable to this first network element, and can achieve the same or similar beneficial effects.

An embodiment of the present disclosure further provides an information storage apparatus, performed by a third network element, including:

a storage module, configured to store subscription information of a user equipment, wherein the subscription information carries target address information, wherein the target address information is of one or a group of AAA servers corresponding to a network slice.

As an optional embodiment, the apparatus further includes:

a fifth sending module, configured to send the subscription information of the user equipment to a first network element.

In embodiments of the present disclosure, the UDM or AUSFU sends the subscription information to the AMF. The AMF obtains the address information of the AAA server corresponding to each slice from the subscription information and conveys it to the NSSAAF via relevant messages. The NSSAAF, based on the received AAA server address information, selects the corresponding AAA server, which refines the granularity of AAA server selection, thereby facilitating the distribution of users of varying levels to different AAA servers.

It should be noted that the information storage apparatus according to embodiments of the present disclosure is capable of executing the foregoing information storage method. Then all embodiments of the foregoing information storage method are applicable to this apparatus, and can achieve the same or similar beneficial effects.

An embodiment of the present disclosure further provides a third network element, including a processor and a transceiver, wherein the transceiver receives and sends data under the control of the processor, wherein the processor is configured to perform:

storing subscription information of a user equipment, wherein the subscription information carries target address information, wherein the target address information is of one or a group of AAA servers corresponding to a network slice.

As an optional embodiment, the apparatus further includes:

sending the subscription information of the user equipment to a first network element.

In embodiments of the present disclosure, the UDM or AUSFU sends the subscription information to the AMF. The AMF obtains the address information of the AAA server corresponding to each slice from the subscription information and conveys it to the NSSAAF via relevant messages. The NSSAAF, based on the received AAA server address information, selects the corresponding AAA server, which refines the granularity of AAA server selection, thereby facilitating the distribution of users of varying levels to different AAA servers.

It should be noted that the third network element according to embodiments of the present disclosure is capable of executing the foregoing information storage method. Then all embodiments of the foregoing information storage method are applicable to this third network element, and can achieve the same or similar beneficial effects.

An embodiment of the present disclosure further provides a network element, wherein the network element is a first network element, a second network element, or a NSSAAF network element, including a memory, a processor, and a program stored in the memory and capable of running on the processor, wherein the processor is configured to execute the program to implement the steps in the foregoing network element selection method, or, to implement the steps in the foregoing information transmission method or information storage method, and can achieve the same technical effect. To avoid repetition, it will not be repeated here.

An embodiment of the present disclosure further provides a computer-readable storage medium storing therein a computer program, wherein the computer program is configured to be executed by a processor to implement the steps in the foregoing network element selection method, or, to implement the steps in the foregoing information transmission method or information storage method and can achieve the same technical effect. To avoid repetition, it will not be repeated here. Wherein the computer-readable storage medium includes, for example, Read-Only Memory (ROM), Random Access Memory (RAM), magnetic disk, or optical disk, etc.

Those skilled in the art should know that the embodiment of the disclosure may be provided as a method, a system, or a computer program product. Therefore, the disclosure may adopt a form of pure hardware embodiment, pure software embodiment, or combined software and hardware embodiment. Moreover, the disclosure may adopt a form of computer program product implemented in one or more computer-readable storage media (including, but not limited to, a disk memory, an optical memory, etc.) including computer-available program codes.

The disclosure is described with reference to flowcharts and/or block diagrams of the method, device (system), and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor, or a processor of another programmable data processing device to generate a machine, so that a device for realizing a function specified in one flow or multiple flows in the flowcharts and/or one block or multiple blocks is generated by the instructions executed through the computer or the processor of the other programmable data processing device.

These computer program instructions may also be stored in a computer-readable storage medium capable of guiding the computer or the other programmable data processing device to work in a specific manner, so that a product including an instruction apparatus may be generated by the instructions stored in the computer-readable storage medium, the instruction apparatus realizing the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the flowcharts and/or one block or multiple blocks in the block diagrams are provided by the instructions executed on the computer or the other programmable data processing device.

The above is the optional implementation mode of the disclosure. It is to be pointed out that those of ordinary skill in the art may further make a plurality of improvements and embellishments without departing from the principle of the disclosure, and these improvements and embellishments shall also fall within the scope of protection of the disclosure.

What is claimed is:

1. A network element selection method, performed by a first network element, comprising:

selecting a network slice-specific authentication and authorization function (NSSAAF) network element according to first information; wherein the first information comprises at least one of the following:

single network slice selection assistance information (S-NSSAI) for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier, wherein before the selecting the NSSAAF network element according to the first information, the method further comprises:

obtaining subscription information of user equipment from a third network element; wherein the subscription information carries target address information, and the target address information is of one or a group of authentication, authorization, and accounting (AAA) servers corresponding to the network slice.

2. The network element selection method according to claim 1, wherein the selecting the NSSAAF network element according to the first information, comprises:

sending a first request message to a second network element, wherein the first request message comprises the first information;

receiving a first response message from the second network element, wherein the first response message comprises fully qualified domain names (FQDN) and/or address information of one or a group of NSSAAF;

selecting the NSSAAF according to the first response message and a predetermined selection strategy.

3. The network element selection method according to claim 1, wherein after the selecting the NSSAAF network element, the method further comprises:

sending an authorization request message to the selected NSSAAF network element, wherein the authorization request message comprises the target address information.

4. The network element selection method according to claim 3, wherein the authorization request message further comprises at least one of the following:

a GPSI;

S-NSSAI for the network slice;

extensible authentication protocol (EAP) information.

5. A first network element for performing the network element selection method according to claim 1, comprising a processor and a transceiver; wherein the transceiver receives and sends data under the control of the processor, wherein the processor is configured to perform:

selecting a network slice-specific authentication and authorization function (NSSAAF) network element according to first information, wherein the first information comprises at least one of the following:

single network slice selection assistance information (S-NSSAI) for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier, wherein before the selecting the NSSAAF network element according to the first information, the processor is further configured to perform:

obtaining subscription information of user equipment from a third network element;

wherein the subscription information carries target address information, and the target address information is of one or a group of authentication, authorization, and accounting (AAA) servers corresponding to the network slice.

6. A non-transitory computer-readable storage medium storing therein a computer program; wherein the computer program is configured to be executed by a processor to implement the steps in the network element selection method according to claim 1.

7. An information transmission method, performed by a second network element, comprising:

receiving a first request message from a first network element; wherein the first request message comprises first information, and the first information comprises at least one of the following:

S-NSSAI for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier;

sending a first response message, according to the first request message, to the first network element; wherein the first response message comprises fully qualified domain names (FQDN) and/or address information of one or a group of NSSAAF.

8. A second network element for performing the information transmission method according to claim 7, comprising a processor and a transceiver, wherein the transceiver receives and sends data under the control of the processor, wherein the processor is configured to perform:

receiving a first request message sent by a first network element, wherein the first request message comprises first information; wherein the first information comprises at least one of the following:

single network slice selection assistance information (S-NSSAI) for a network slice;

a home network identifier in a subscription permanent identifier (SUPI);

a data network name (DNN);

a generic public subscription identifier (GPSI);

a subscription permanent identifier (SUPI);

a subscription concealed identifier (SUCI);

an external group ID;

an internal group ID;

and a routing identifier;

sending, according to the first request message, a first response message to the first network element; wherein the first response message comprises fully qualified domain names (FQDN) and/or address information of one or a group of NSSAAF.

9. A non-transitory computer-readable storage medium storing therein a computer program; wherein the computer program is configured to be executed by a processor to implement the steps in the information transmission method according to claim 7.

10. An information transmission method, performed by a network slice-specific authentication and authorization function (NSSAAF) network element, comprising:

receiving authorization request message from a first network element; wherein the authorization request message comprises target address information, and the target address information is of one or a group of AAA servers corresponding to a network slice requested by a user equipment.

11. The information transmission method according to claim 10, wherein the authorization request message further comprises at least one of the following:

a GPSI;

S-NSSAI for the network slice;

extensible authentication protocol (EAP) information.

12. The information transmission method according to claim 10, further comprising:

selecting a corresponding AAA server for the user equipment according to the target address information.

13. The information transmission method according to claim 12, wherein when the AAA servers comprise a fourth network element and a fifth network element, the method further comprises:

sending an AAA protocol message to the fifth network element, wherein the AAA protocol message is forwarded to the fourth network element by the fifth network element;

wherein the AAA protocol message carries the target address information.

14. The information transmission method according to claims 13, wherein the AAA protocol message further comprises at least one of the following:

a GPSI;

S-NSSAI for the network slice;

extensible authentication protocol (EAP) information.

15. The information transmission method according to claim 12, wherein when the AAA servers comprise a fourth network element, the method further comprises:

sending an AAA protocol message to the fourth network element, wherein the AAA protocol message comprises the target address information.

16. The information transmission method according to claim 10, wherein the target address information is obtained by the first network element from subscription information of the user equipment sent by a third network element.

17. A NSSAAF network element for performing the information transmission method according to claim 10, comprising a processor and a transceiver, wherein the transceiver receives and sends data under the control of the processor, wherein the processor is configured to perform:

receiving an authorization request message from a first network element; wherein the authorization request message comprises target address information, and the target address information is of one or a group of AAA servers corresponding to a network slice requested by a user equipment.

18. A non-transitory computer-readable storage medium storing therein a computer program; wherein the computer program is configured to be executed by a processor to implement the steps in the information transmission method according to claim 10.

* * * * *